United States Patent
Wicks et al.

(10) Patent No.: US 6,519,480 B1
(45) Date of Patent: Feb. 11, 2003

(54) WIRELESS TELEPHONE WITH VIRTUAL DIALER

(75) Inventors: James E. Wicks, San Francisco, CA (US); Yutaka Hasegawa, Edgewater, NJ (US)

(73) Assignees: Sony Corporation (JP); Sony Electronics, Inc., Parkridge, NJ (US)

( * ) Notice: Subject to any disclaimer, the term of this patent is extended or adjusted under 35 U.S.C. 154(b) by 887 days.

(21) Appl. No.: 08/827,107

(22) Filed: Mar. 17, 1997

(51) Int. Cl.[7] ................................................. H04B 1/38
(52) U.S. Cl. ....................................................... 455/566
(58) Field of Search ................................ 455/566, 550, 455/89, 90, 575, 564; 379/433, 434, 142, 426, 428; 329/433.01, 433.04, 428.01, 433.07

(56) References Cited

U.S. PATENT DOCUMENTS

| | | | |
|---|---|---|---|
| D298,035 S | 10/1988 | Watanabe | D14/64 |
| D319,234 S | 8/1991 | Konno et al. | D14/147 |
| 5,054,051 A | 10/1991 | Hoff | 379/56 |
| D326,451 S | 5/1992 | Roegner | D14/138 |
| D328,070 S | 7/1992 | Seay | D14/138 |
| 5,197,091 A * | 3/1993 | Takagi et al. | 455/90 |
| D336,472 S | 6/1993 | Lin | D14/138 |
| D337,764 S | 7/1993 | Paton et al. | D14/138 |
| D352,708 S | 11/1994 | Rossi | D14/138 |
| D356,085 S | 3/1995 | Fellinger | D14/148 |
| 5,404,390 A | 4/1995 | Tamura | 379/58 |
| 5,436,954 A * | 7/1995 | Nishiyama et al. | 455/90 |
| D369,796 S | 5/1996 | Grewe | D14/138 |
| 5,551,069 A * | 8/1996 | Harrison et al. | 455/90 |
| 5,742,912 A * | 4/1998 | Nishiyama et al. | 455/566 |
| 5,841,849 A * | 11/1998 | Macor | 379/142 |

* cited by examiner

Primary Examiner—William Trost
(74) Attorney, Agent, or Firm—Rader, Fishman, & Grauer PLLC; Ronald P. Kananen, Esq.

(57) ABSTRACT

A virtual dialer allows a wireless telephone unit to dispense with a numeric keypad, thereby allowing additional room for an enhanced display without sacrificing the compactness of the unit. The virtual dialer includes a short joystick and an image of a telephone numeric keypad displayed on a display. The joystick is used to move a cursor around on the image of the numeric keypad. The joystick or a selection button is pressed when the cursor highlights the image of the numeric key representing the digit to be entered. In this way, a phone number to be called is dialled without the presence of an actual numeric keypad.

10 Claims, 1 Drawing Sheet

WIRELESS TELEPHONE WITH VIRTUAL DIALER

FIELD OF THE INVENTION

The present invention relates generally to the field of wireless telephony. Specifically, the present invention relates to a more compact and ergonomic means for dialling a telephone number into a wireless telephone unit.

BACKGROUND OF THE INVENTION

Since their introduction, wireless communication systems including pagers, cellular telephones and low-tier radio telephones, have become increasingly popular. Such devices provide an extremely convenient means of communication.

Wireless communication systems, particularly cellular telephones and low-tier radio telephones, are convenient because they allow their users to communicate from almost any location in a service area. Wireless phones also save time. For example, the user of a wireless telephone unit need not waste time looking for an available telephone in order to place a call.

A wireless telephone unit also allows its user to take advantage of time spent traveling. For example, with a wireless telephone, the user can be transacting business or making appointments while driving, riding or walking.

In order to utilize fully these advantages of wireless telephones, it should be convenient for the user to have the wireless telephone unit readily available at all times. In recognition of this fact, modern wireless telephones have become increasingly smaller and lighter to facilitate being carried by the user.

Moreover, a wireless telephone user who is walking or driving, may have only a single hand readily available to operate the wireless telephone unit. This consideration has lead to some attempts to design wireless telephone units that are easily operated with a single hand.

A typical wireless telephone may have a small liquid crystal display capable of displaying, for example, up to four lines of text. Using such a display, the user may scroll through stored data, such as a directory of telephone numbers, and select, for example, a number to be called. The display may also show a list of functions through which the user can scroll. When a function, such as speaker volume, is selected, the user can then input information or parameters to govern that function.

Accordingly, a wireless telephone unit with a display can be readily programmed and adapted to provide many features and functions that would not otherwise be available. However, as may be appreciated, the goal of providing a large, versatile, easily read display on a wireless telephone unit is at odds with the goal of providing a compact unit. Accordingly, there is a need for an improved wireless telephone unit that is both compact and ergonomic, but which also provides a large, versatile, easily read display.

OBJECTS OF THE INVENTION

Accordingly it is an object of the present invention to meet the above-described needs and others. It is an object of the present invention to provide a wireless telephone unit which is compact and ergonomic and has a large, versatile, easily read display.

More particularly, it is an object of the present invention to provide a wireless telephone with a virtual dialer that can replace the standard keypad, thereby allowing more room for an enhanced display without increasing the size of the unit.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may encompass a wireless telephone unit having a virtual dialer having: a display; an image of a numeric keypad displayed on the display, the image comprising a plurality of digit keys, each digit key representing a digit; a cursor and a cursor controller, wherein the cursor moves on the display among the digit keys in response to the cursor controller, the cursor highlighting one of the digit keys at a time; and a digit selection key which, when pressed, indicates selection of one of the digit keys highlighted by the cursor.

The cursor controller may be a trackball or joystick. If a joystick is used, the digit selection key may be located under the joystick and actuated by downward pressure on the joystick. A digit represented by a selected digit key may be displayed on the display.

The present invention also encompasses a method of using a wireless telephone unit having a virtual dialer by: providing a display; displaying an image of a numeric keypad on the display, the image comprising a plurality of digit keys, each digit key representing a digit; moving a cursor with a cursor controller on the display, the cursor moving among the digit keys in response to the cursor controller and highlighting one of the digit keys at a time; and pressing a digit selection key to indicate selection of one of the digit keys highlighted by the cursor.

Again, the cursor controller may be a trackball or joystick. If a joystick is used, the pressing of a digit selection key may be accomplished by applying downward pressure on the joystick. The present method may continue by displaying a digit represented by a selected digit key on the display.

The present invention may also encompass a wireless telephone unit having an antenna which is movable between a first extended position and a second retracted position. The antenna may serve as a clip when in the second retracted position. This feature may be combined with a unit embodying the described virtual dialer or as part of the method of using such a unit.

BRIEF DESCRIPTION OF THE DRAWINGS

The accompanying drawings illustrate the present invention and are a part of the specification. Together will the following description, the drawings demonstrate and explain the principles of the present invention. In the drawings.

DETAILED DESCRIPTION OF THE PREFERRED EMBODIMENT

According to the principles of the present invention, a compact and ergonomic wireless telephone unit having an enhanced display for accomplishing the above described objects is provided.

Figure 1:
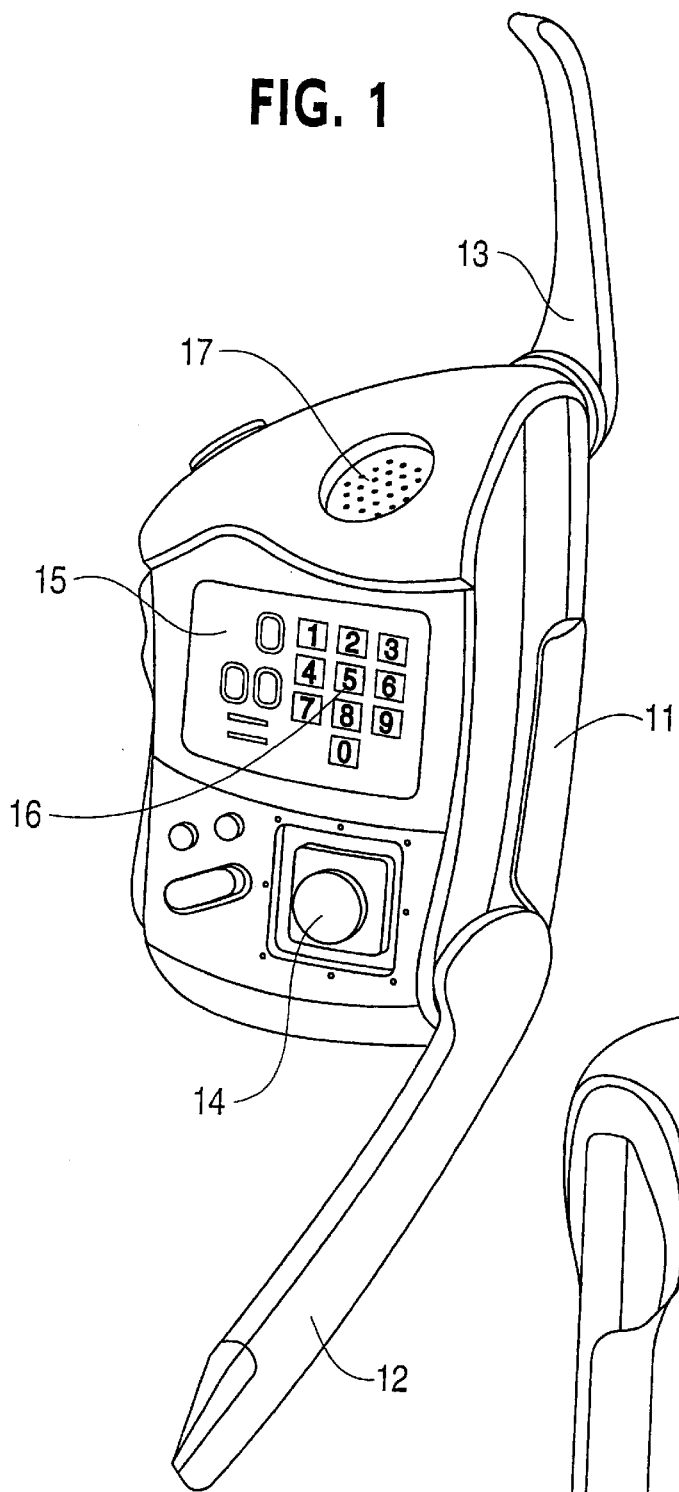
FIG. 1 illustrates a wireless telephone unit of the present invention which incorporates a virtual dialling system.

As shown in FIG. 1, the wireless telephone unit 11 of the present invention has a speaker 17, a display 15, e.g., a liquid crystal display, an antenna 13 and a microphone 12. To further enhance the compactness of the unit 11, the microphone 12 may be provided on an arm that can slide or fold into the main body of the wireless telephone unit 11.

Figure 2:
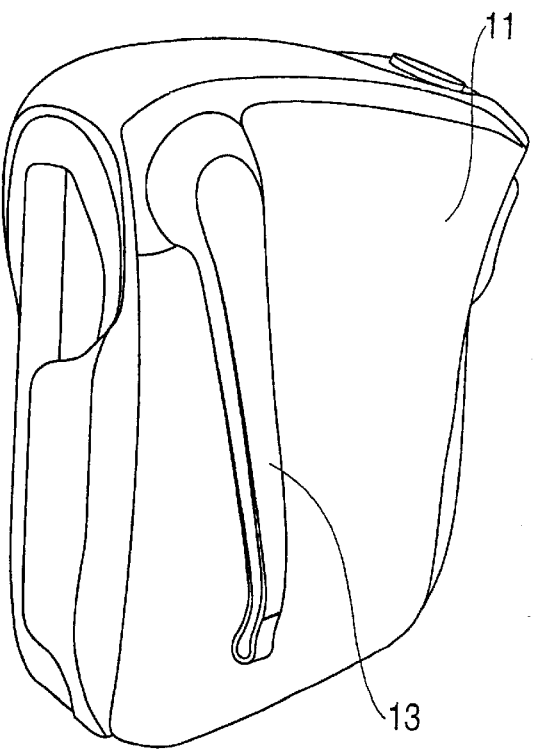
FIG. 2 illustrates a rear view of the wireless telephone unit of the present invention.

As shown in FIG. 2, the antenna 13 may be rotated in the plane of the back surface of wireless phone unit 11. When in the position shown in FIG. 2, the antenna 13 may serve as a belt clip with which the wireless telephone unit 11 may be attached to the belt of a user. This feature further contributes to the compactness of the unit 11.

As shown in FIG. 1, the image of a standard telephone keypad 16 is displayed on display 15. A cursor on the displayed image 16 is shown in FIG. 1 as highlighting the number 5. The virtual dialling system or virtual dialer of the present invention includes this displayed image of a numeric keypad 16 and a short joystick 14.

Joystick 14 is preferably short and thick so as to be easily operated by the thumb or a single finger of a user. The upper surface of the joystick 14 may be indented to facilitate movement of the joystick 14 with a user's thumb or finger. The joystick 14 is biased in an upright position, but may be displaced in any direction. In the upright position, the short shaft of the joystick 14 is substantially perpendicular to the plane of the display 15.

The cursor on the displayed image of a numeric keypad 16 is controlled by the joystick 14. When the joystick is in the upright position, the cursor highlights the button for digit "5" on the displayed image of a numeric keypad 16. When the joystick is displaced, the cursor moves in a corresponding direction to highlight some other digit of the displayed keypad 16.

For example, if the joystick is displaced upward, in the direction of the display, the cursor will move to highlight digit "2" on the displayed keypad 16. If the joystick is displaced toward the lower left-hand corner, the cursor will move to highlight digit "7" on the displayed key pad 16. If the joystick is displaced downward, away from the display, the cursor will move to highlight digit "8." However, if the joystick is moved downward, returned to the upright position, and the moved downward again in rapid succession, the cursor will move to highlight the digit "0" on the displayed keypad 17.

When the user of the wireless telephone unit wishes to dial a telephone number, he or she simply moves the joystick 14 as indicated above to highlight the first digit in the phone number to be dialled. When the digit is highlighted, the user selects the highlighted digit.

In the preferred embodiment, this selection is accomplished by pressing the joystick 14 down into the unit 11 to actuate a selection button disposed under the joystick 14 and internal to the unit 11. This allows the user to highlight and select a number without removing a thumb or finger from the joystick 14. Alternatively, the selection may be accomplished by pressing a selection button disposed at the side of joystick 14.

The button selected may be displayed on display 15 beside the displayed image of a keypad 16. This allows the user to see what numbers have been dialled. The user then continues highlighting and selecting digits until the phone number to be dialled has been entered into the telephone. The wireless telephone unit 11 may then automatically dial the number or await some further input from the user.

As will be appreciated, the joystick of the present invention could be replaced by equivalent means of moving the cursor over the display, e.g. a trackball.

As described, the virtual dialer of the present invention replaces the required numeric keypad on a wireless telephone unit. This allows more room for an enhanced display while maintaining the compactness of the unit.

The preceding description has been presented only to illustrate and describe the invention. It is not intended to be exhaustive or to limit the invention to any precise form disclosed. Many modifications and variations are possible in light of the above teaching. The details of a suitable interfaces between side-mounted shuttles, encoded memory and displays are known to the art.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A wireless telephone unit having a virtual dialer comprising:
    a display;
    an image of a numeric keypad displayed on said display, said image comprising a plurality of digit keys, each digit key representing a digit;
    a cursor and a cursor controller comprising a joystick, wherein said cursor moves on said display among said digit keys in response to said cursor controller, said cursor highlighting one of said digit keys at a time, wherein a top portion of said joystick is indented to better accommodate manipulation of said joystick with a human thumb or finger; and
    a digit selection key which, when pressed, indicates selection of one of said digit keys highlighted by said cursor, wherein said digit selection key is located underneath said cursor controller and is actuated by downward pressure on said cursor controller.

2. A wireless telephone unit as claimed in claim 1, further comprising an antenna, wherein said antenna moves between a first extended position and a second retracted position.

3. A wireless telephone unit as claimed in claim 2, wherein said antenna comprises a clip when in said second retracted position.

4. A wireless telephone unit as claimed in claim 1, wherein a digit represented by a selected digit key is displayed on said display.

5. A method of placing a wireless telephone call using a wireless telephone unit having a virtual dialer comprising:

displaying an image of a numeric keypad on a display, said image comprising a plurality of digit keys with keys for digits 1 to 9 being arranged in a 3×3 array;

moving a cursor on said display with a joystick, said cursor moving among said digit keys in response to movement of said joystick to successively highlight a series of said digit keys; and repeatedly pressing a digit selection key to indicate individual selection of said digit keys highlighted by said cursor to enter a series of digits which corresponds to a phone number to be called;

wherein said image also comprises a zero digit key located below said 3×3 array, said method comprising moving said joystick downward twice in succession to highlight said zero digit key.

6. A method as claimed in claim 5, further comprising manipulating said joystick with an indented portion at an end of said joystick.

7. A method as claimed in claim 6, wherein said pressing a digit selection key is accomplished by applying downward pressure on said joystick.

8. A method as claimed in claim 5, further comprising moving an antenna between a first extended position and a second retracted position.

9. A method as claimed in claim 8, further comprising using said antenna as a clip when said antenna is in said second retracted position.

10. A method as claimed in claim 5, further comprising displaying a digit represented by a selected digit key on said display.

* * * * *